United States Patent
Fox et al.

(10) Patent No.: US 8,376,902 B2
(45) Date of Patent: Feb. 19, 2013

(54) EPICYCLIC GEAR SYSTEM WITH FLEXPINS AND HELICAL GEARING

(75) Inventors: Gerald P. Fox, Massillon, OH (US); Randy P. Kruse, North Canton, OH (US); James N. Maloof, Clinton, OH (US)

(73) Assignee: The Timken Company, Canton, OH (US)

( * ) Notice: Subject to any disclaimer, the term of this patent is extended or adjusted under 35 U.S.C. 154(b) by 292 days.

(21) Appl. No.: 12/996,871

(22) PCT Filed: Jun. 11, 2009

(86) PCT No.: PCT/US2009/047007
§ 371 (c)(1),
(2), (4) Date: Dec. 8, 2010

(87) PCT Pub. No.: WO2009/152306
PCT Pub. Date: Dec. 17, 2009

(65) Prior Publication Data
US 2011/0082005 A1    Apr. 7, 2011

Related U.S. Application Data

(60) Provisional application No. 61/061,390, filed on Jun. 13, 2008, provisional application No. 61/077,386, filed on Jul. 1, 2008.

(51) Int. Cl.
*F16H 1/48* (2006.01)
(52) U.S. Cl. ....................................... 475/347
(58) Field of Classification Search .................. 475/346, 475/347
See application file for complete search history.

(56) References Cited

U.S. PATENT DOCUMENTS

| | | | |
|---|---|---|---|
| 3,943,787 A | 3/1976 | Hicks | |
| 6,764,219 B2 | 7/2004 | Doll et al. | |
| 8,308,602 B2 * | 11/2012 | Hicks | 475/331 |
| 2005/0075211 A1 | 4/2005 | Fox et al. | |
| 2008/0269007 A1 * | 10/2008 | Cunliffe et al. | 475/347 |

FOREIGN PATENT DOCUMENTS

| | | |
|---|---|---|
| DE | 1500451 | 5/1969 |
| WO | WO/03/002891 | 1/2003 |
| WO | WO/2005/050058 | 6/2005 |
| WO | WO/2007/007049 | 1/2007 |
| WO | WO/2007/016336 | 2/2007 |
| WO | WO/2007/028965 | 3/2007 |

* cited by examiner

*Primary Examiner* — Sherry Estremsky
(74) *Attorney, Agent, or Firm* — Polster Lieder Woodruff & Lucchesi, L.C.

(57) ABSTRACT

An epicyclic gear system (A) includes helical sun and ring gears (2, 4) and helical planet pinions (6) located between and engaged with the sun and ring gears. The gear system also includes a carrier (8) having an end wall (12) and flexpins (20) cantilevered from the end wall and extended into the planet pinions. Each flexpin at its end remote from the end wall carries a sleeve (22) that extends back over the flexpin where it is spaced from the flexpin. The planet pinion for the flexpin rotates around the sleeve on a bearing (24). The arrangement is such that the flexpin will flex adjacent to the carrier end wall circumferentially along the pitch circle of the carrier in one direction and circumferentially in the opposite direction adjacent to attachment of the sleeve. But the helical gear imparts a couple to the planet pinion that seeks to tilt the sleeve radially toward or away from the main axis of the system. A deflection inhibitor (I) lies between each flexpin and the sleeve surrounding it to prevent the radial deflection.

18 Claims, 4 Drawing Sheets

US 8,376,902 B2

EPICYCLIC GEAR SYSTEM WITH FLEXPINS AND HELICAL GEARING

CROSS REFERENCE TO RELATED APPLICATIONS

This application derives priority from and otherwise claims the benefit of U.S. Provisional Application 61/061,390, filed Jun. 13, 2008, and U.S. Provisional Application 61/077,386 filed Jul. 1, 2008, and also International Application PCT/US2009/047007, filed Jun. 11, 2009, and published under International Publication Number WO 2009/152306, all of which are incorporated herein by reference.

TECHNICAL FIELD

This invention in general relates to epicyclic gear systems and more particularly to epicyclic gear systems with flexpins and helical gearing.

BACKGROUND ART

The typical epicyclic gear system has a sun gear, a ring gear surrounding the sun gear, and several, often three, planet pinions located between and engaged with the sun and ring gears, and in addition, it has a carrier that is coupled to the planet pinions to establish axes about which they rotate. A gear system so configured splits the torque transferred through the system into load paths equal in number to the number of planet pinions. This reduces the forces at each mesh and enables the system to transfer a large amount of power in a relatively compact configuration. In other words, it provides a high power density.

Often the ring gear remains fixed, leaving the carrier and sun gear to rotate. In such an arrangement power may be applied at one end of the carrier and delivered through the sun gear at a different velocity and torque. This holds true for the transmissions in wind turbines that harness the energy of the wind and convert it into electrical power.

Typically, epicyclic gear systems rely on spur gearing in which the teeth of the gears lie parallel to the axes of the gears. However, helical and double helical gears are available, but have not found favor.

Irrespective of the type of gearing, machining tolerances in the manufacture of such gears leave variations in the meshes between the several planet pinions and the sun and ring gears. As torque is applied to the system the mesh with the least clearance transfers the load by itself, until that mesh deflects enough to enable the mesh with the next least clearance to take some of the load. The progression continues until all of the meshes accommodate the load. But some of the meshes support more of the load than others.

Many epicyclic gear systems utilize a straddle-type carrier in which the planet pinions rotate between two walls on pins that extend between the walls, each pin being anchored at both of its ends in the walls. When torque is applied to the carrier at one of the end walls, the carrier will twist and advance one end of each pin ahead of the other. This skews the planet pinions with respect to the sun and ring gears, and disturbs the mesh between the planet pinions and the sun and ring gears.

An epicyclic gear system in which the planet pinions are supported on and rotate about so-called "flexpins" helps mitigate unequal load distribution among the planet pinions and skewing of the pinions as well. In this regard, a flexpin for a planet pinion at one end is anchored in and cantilevered from the wall of the carrier of which it is a part. The other end of the flexpin has a sleeve fitted firmly to it, with the sleeve extending back over and otherwise spaced radially from the flexpin. The sleeve forms part of or carries a bearing that supports one of the planet pinions. At the carrier wall the flexpin bends in one direction circumferentially relative to the main axis and at its opposite end bends in the other direction, again circumferentially, all such that the sleeve remains parallel to the axis. In other words, flexpin technology employs a double cantilever to equalize load distribution and to offset the skewing that would otherwise occur. See U.S. Pat. No. 7,297,086 and WO 2007/016336, which are incorporated herein by reference, for a further discussion of flexpin technology.

Helical gears operate more smoothly and with less noise than spur gears. Moreover, the teeth on a helical gear are longer and stronger than the teeth on a spur gear of equivalent size. But helical gearing has not found favor in epicyclic gear systems that utilize flexpin technology, because the planet pinions experience thrust loading at the mesh between the sun gear and planet pinions and additional thrust loading at the mesh between the planet pinions and ring gear—indeed, in the opposite directions. As a result, each planet pinion undergoes a couple that tilts the sleeve about which it rotates toward or away from the main axis of the system. While flexure of the flexpins circumferentially along the pitch circle for the carrier serves to improve the mesh between the planet pinions and the sun and ring gears, flexure toward and away from the main axis disturbs the mesh, increasing wear and noise. To be sure, herringbone gears with double helices eliminate the problem, but the manufacture of such gears introduces complexities and expense not present with helical gears.

BEST MODES FOR CARRYING OUT THE INVENTION

Figure 1:
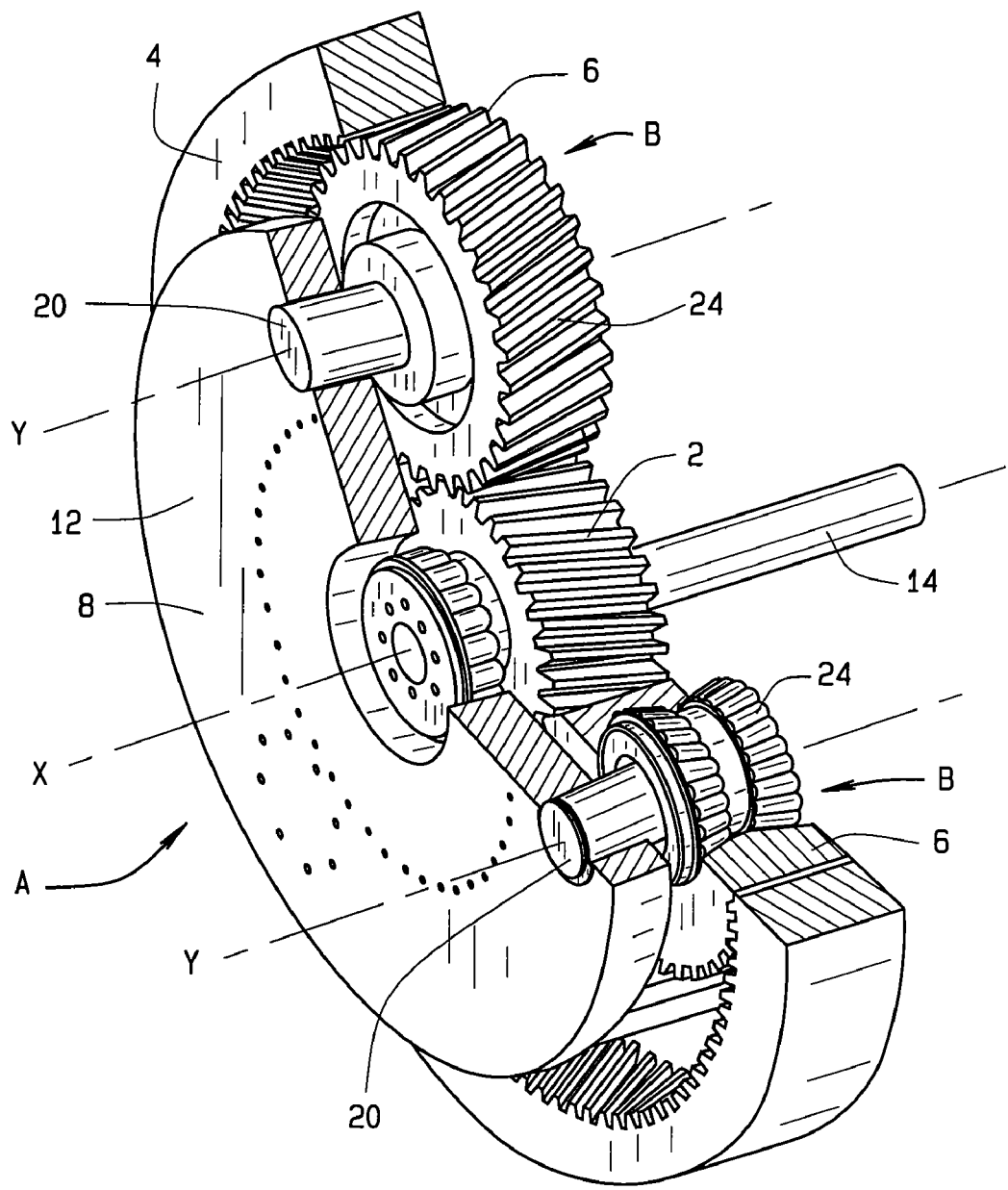
FIG. 1 is a perspective view, partially broken away and in section, of an epicyclic gear system constructed in accordance with and embodying the present invention.

Referring now to the drawings, an epicyclic gear system A (FIG. 1) that is organized about a central axis X, includes a sun gear 2, and ring gear 4, and planet pinions 6 located between an engaged with the sun gear 2 and ring gear 4. All are helical gears, and as such their teeth are oriented at angles with respect to the axes of those gears. In addition, the transmission A includes a carrier 8 that establishes axes Y about which the planet pinions 6 rotate. Any one of the sun gear 2 or the ring gear 4 or the carrier 8 may remain fixed against rotation, while the other two rotate, torque being applied to one and delivered from the other. In the transmission A that is illustrated, torque is applied to the carrier 8 and delivered from the sun gear 2, while the ring gear 4 remains fixed. It is well suited for use in a wind turbine between the wind-driven rotor and the electrical generator of the wind turbine. To this end, the carrier 8 has an end wall 12 or other end member to which torque is applied, while the sun gear 2 has an output shaft 14 coupled to it.

In addition to the end wall 12, the carrier 8 has (FIG. 2) flexpins 20 that project from and indeed are cantilevered from the end wall 12, one flexpin 20 for each planet pinion 6. Each flexpin 20 at its end remote from the end wall 10 is fitted with a sleeve 22 that extends back over the flexpin 20 towards the end wall 12, yet is spaced from flexpin 20 except at the remote end of the flexpin 20 where the sleeve 22 fits firmly and securely around the flexpin 20. In effect, the sleeve 22 is cantilevered from the remote end of the flexpin 20—creating a double cantilever so to speak.

The sleeve 22 along its outwardly presented surface supports a bearing 24 (FIG. 2), and the bearing 24 in turn supports one of the planet pinions 6. The bearing 24 may take the form of a double row tapered roller bearing with the sleeve 22 and pinion 6 providing raceways 26 along which tapered rollers 28 roll. Alternatively, the inner raceways 26 may be on separate inner races called cones that fit snugly over the sleeve 22. Likewise, the outer raceways 26 for the bearing 24 may be on separate races, called cups, fitted into the planet pinion 6. Then again, the sleeve 22, may serve as a journal for a simple plain bearing. Should the bearing 24 take the form of an antifriction bearing, it need not be a tapered roller bearing. Indeed, it could take the form of a double row angular contact ball bearing, one or more deep groove ball bearings, a cylindrical roller bearing, a needle bearing, or a spherical roller bearing.

Figure 2:
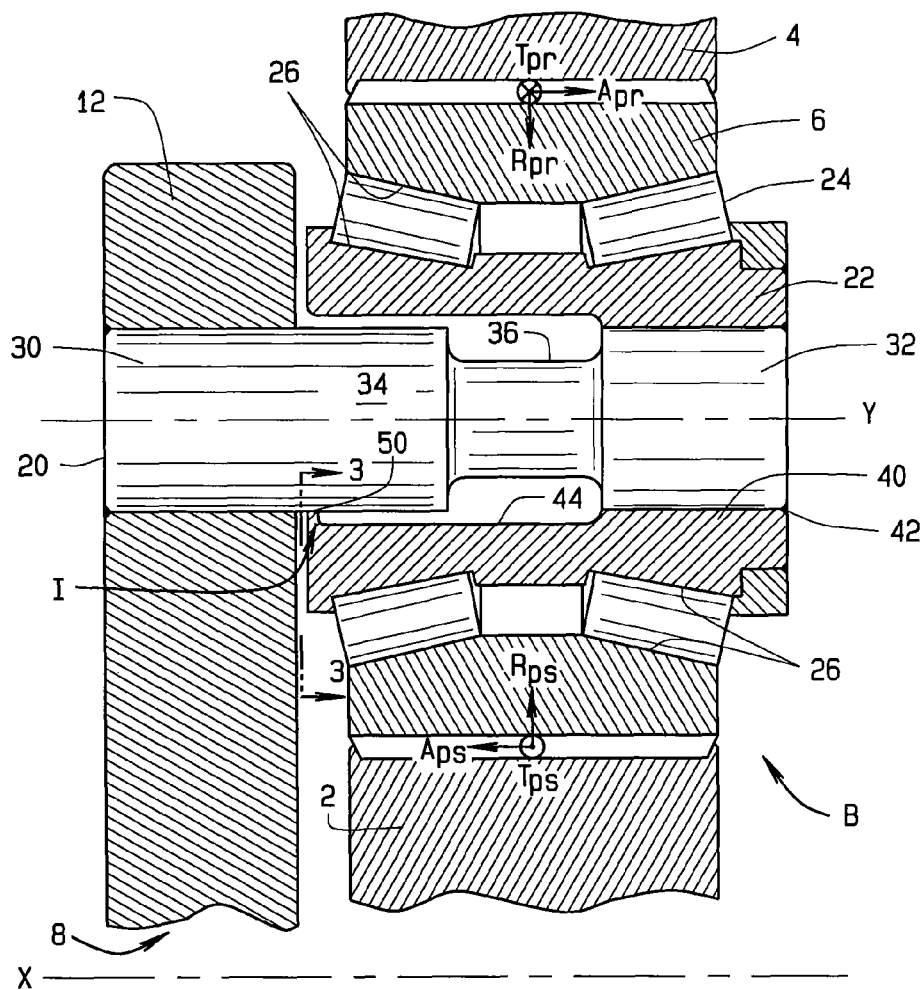
FIG. 2 is a longitudinal sectional view of a flexpin assembly forming part of the epicyclic gear system and having a deflection inhibitor.

The flexpin 20, the sleeve 22 that it supports, and the bearing 24 that enables the pinion 6 to rotate on the sleeve 22, with or without the pinion 6, constitute a flexpin assembly B (FIG. 2). When the inner raceways 26 are actually on the sleeve 22 in the sense that they form surfaces of the sleeve 22, the arrangement is sometimes referred to as an "integrated flexpin."

The double cantilever formed by the flexpin 20 and the sleeve 24 that extends back over the flexpin 20 enables the offset axis Y about which the planet pinion 6 rotates to remain substantially parallel to the central axis X. This in turn insures a good mesh between the planet gear 6 and the sun and ring gears 2 and 4. More specifically, as torque is applied to the end wall 12, each flexpin 20 deflects near the wall 12 generally circumferentially, along the pitch circle defined by the several flexpins 20, so that its remote end trails the end that is anchored in the wall 12. The pin 20, however, possesses enough flexibility at its remote end to flex in the opposite direction circumferentially so as to enable the sleeve 22 to remain parallel to the central axis X. Contrast this with a straddle-type carrier with two walls in which each pin is anchored at both of its ends in the two walls. That type of carrier deforms under the torque transmitted through it, and the pins skew with regard to the central axis of the transmission. The double cantilever further enables the flexpin assembly B to better share the torque transmitted with other flexpin assemblies B in the system A.

The flexpin 20 for each planet pinion 6 has (FIG. 2) a base 20 at which it is fitted to the end wall 12 of the carrier 8 and a head 32 at which the sleeve 22 is fitted to the flexpin 20. Between the base 30 and the head 32 the flexpin 20 has a shank 34. To enhance the flexibility of the flexpin 20 remote from the end wall 12, the shank 34 may contain a groove 36 next to the head 32.

The sleeve 22 at its end remote from the end wall 12 of the carrier 8 has a mounting segment 40 along which it fits tightly over the head 32 of the flexpin 20. Indeed, the head 32 and mounting segment are joined securely together such as by a weld 42. Beyond the mounting segment 40, the sleeve 22 has a bore 44, the surface of which is spaced slightly from the shank 34 of the flexpin 20, so that the sleeve 22 can displace at least circumferentially along the pitch circle defined by the flexpins 20.

Where each planet pinion 6 meshes with the ring gear 4 a force develops when torque transfers through the system A. After all, the torque transfers at the meshing teeth of the planet pinion 6 and ring gear 4. That force resolves into a tangential component $T_{pr}$ that actually transfers the torque and a radial component $R_{pr}$, as holds true for meshing spur gears. In addition, the force resolves into a thrust or axial component $A_{pr}$ owing to the helical cut of the meshing teeth. Likewise where the planet pinion 6 and sun gear 2 mesh another force exists, and it resolves into a tangential component $T_{ps}$, a radial component $R_{ps}$, and a thrust or axial component $A_{ps}$ that is resisted at the shaft 14 by a thrust bearing. The tangential components $T_{pr}$ and $T_{ps}$ are equal and additive. They transfer torque, and in so doing cause the flexpin 20 to flex adjacent to the end wall 12 in one direction and adjacent to its head 32 in the opposite direction, with both directions of flexure being along the pitch circle defined by the flexpins 20. In other words, the flexpins 20 flex circumferentially about the main axis X. The radial components $R_{pr}$ and $R_{ps}$ are equal and opposite and cancel each other. They impart no deflection to the flexpin 20.

However, the axial components $A_{pr}$ and $A_{ps}$, while being equal, are also opposite and additive. They do not impose much of a thrust load on the bearing 24. But being additive, they create a couple that seeks to rotate planet pinion 6 about a point along its axis Y. Indeed, if not counteracted, that couple would cause the flexpin 20 to bend in a plane defined by the offset axis Y and the main axis X. That would tilt the pinion 6 and disrupt the mesh between it and the ring gear 4 and between it and the sun gear 2. To deter the planet pinion 6 from tilting as a consequence of the axial force components $A_{pr}$ and $A_{ps}$, a deflection inhibitor I is interposed between the sleeve 22 and the flexpin 30 in a plane defined by the two parallel axes X and Y, or at least it is effective in that plane. The inhibitor I may be carried by the sleeve 22 or by the flexpin 20 or by both, or it may be a separate element interposed between both.

Figure 3:
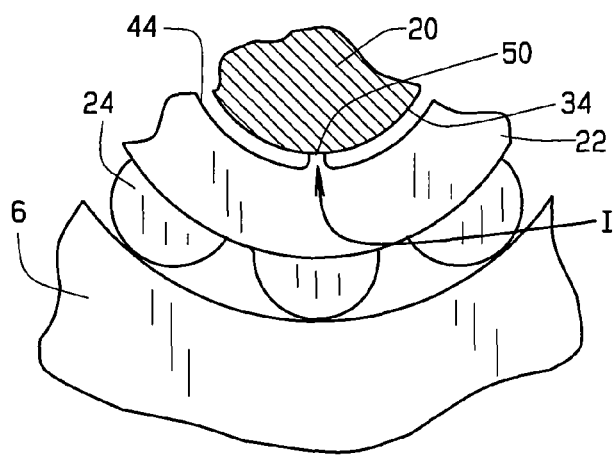
FIG. 3 is a fragmentary sectional view of the flexpin assembly taken along line 3-3 of FIG. 2.

The deflection inhibitor I may take the form of a projection 50 (FIGS. 2 & 3) that extends inwardly from the bore 44 of the sleeve 22 at that end of the sleeve 22 closest to the carrier end wall 12. It lies in a plane defined by the axes Y and X, that is to say, along a radius emanating from the main axis X and extending through the offset axis Y. It either lightly contacts the shank 34 of the flexpin 20 or else lies a short distance from it; perhaps no more than 0.010 inches. The couple produced by the axial components $A_{pr}$ and $A_{ps}$ of the forces acting at the two meshes along the planet pinion 6 drives the projection 50 against the shank 34 of the flexpin 20, but the free end of the sleeve 22 does not move away from the main axis X.

The shank 34 of the flexpin 20 where the projection 50 bears against it may be covered with a tribiological coating to reduce wear and fretting corrosion. The same holds true for the projection 50 itself.

Figure 4:
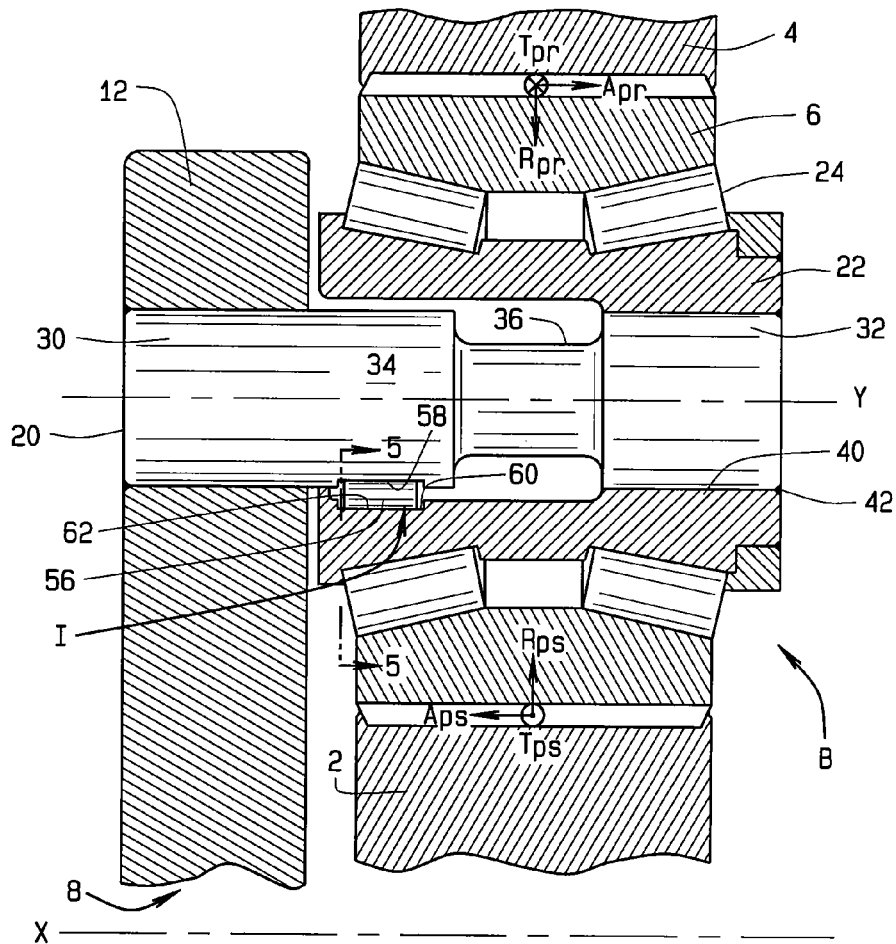
FIG. 4 is a longitudinal sectional view of a flexpin assembly having an alternative deflection inhibitor.
Figure 5:
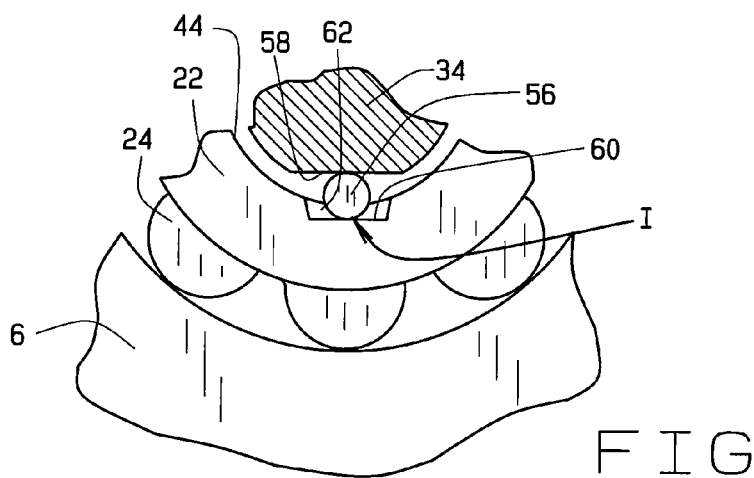
FIG. 5 is a fragmentary sectional view taken along line 5-5.

The deflection inhibitor I may also take the form of a roller 56 (FIGS. 4 & 5) located between the sleeve 22 and the shank 34 of the flexpin 30, again in a plane defined by the parallel axes Y and X. Its axis lies parallel to the axes X and Y. The roller 56 operates against a land 58 on the flexpin 20 and another parallel land 60 in the sleeve 22, with the spacing between the two lands 58 and 60 corresponding to the diameter of the roller 56. Actually, the land 60 extends across the bottom of a pocket 62 that opens into the bore 42 of the sleeve 22 and has end edges and side edges where the spacing between the surface of the bore 42 and the shank 34 of the flexpin 30 is less than the diameter of the roller 56. Thus, the pocket 62 confines the roller 56 so that it cannot be displaced from its operative position between the two lands 58 and 60.

Figure 6:
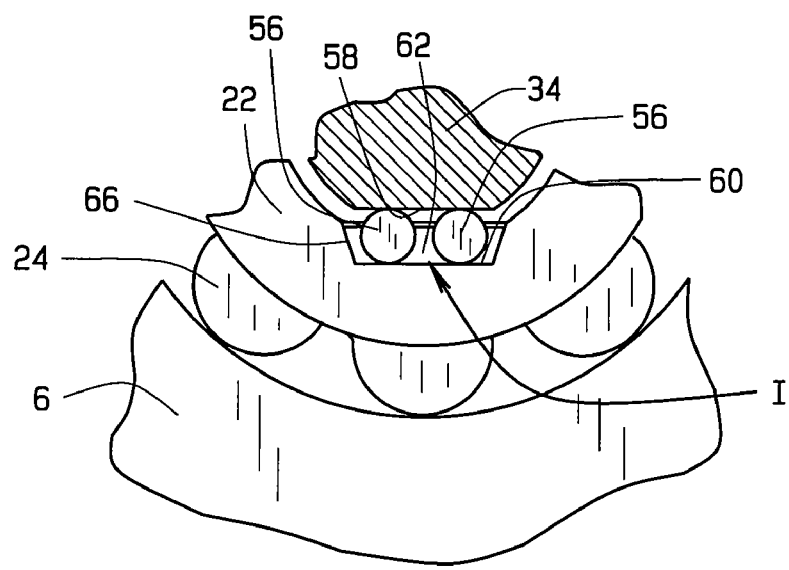
FIG. 6 is a fragmentary sectional view similar to FIG. 5 but showing another alternative deflection inhibitor.

The pocket 62 in the sleeve 22 may contain two rollers 56 (FIG. 6) located side by side, and they may be separated by a cage 66 that is fastened to the sleeve 22 or in the alternative to the shank 34 of the flexpin 30. The cage 66 may serve to position a single roller 56 as well.

Figure 7:
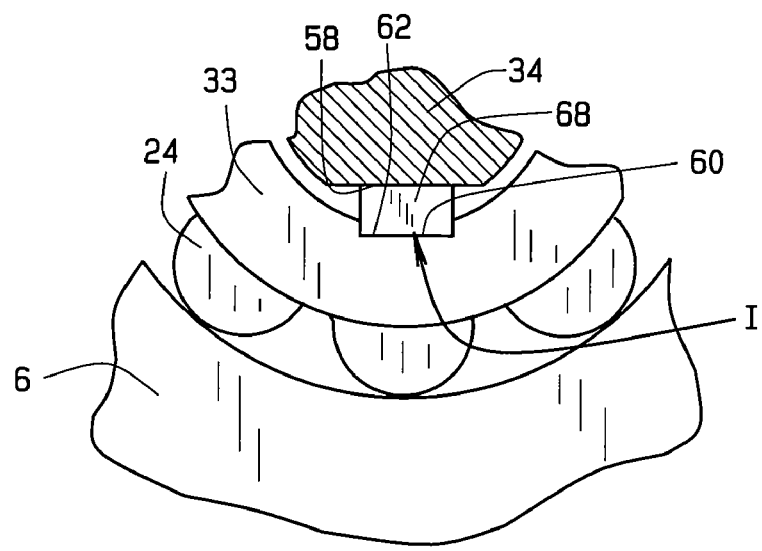
FIG. 7 is a fragmentary sectional view similar to FIG. 5 and showing still another alternative deflection inhibitor.

The deflection inhibitor I may take the form of a pad 68 (FIG. 7) that is attached to the sleeve 22. The pad 68 either lightly contacts the land 58 on the shank 34 of the flexpin 20 or is spaced a minimal distance from it. The pad 68 and the land 58 where they contact, or at least one, may be covered with a tribiological coating. The pad 68 may be attached securely to the shank 34 and contact the land 60, in which event the land 60 should extend beyond the sides of the pad 68.

U.S. Pat. No. 6,764,219 and its international counterpart WO 03/085276, which are incorporated herein by reference, disclose tribiological coatings that are suitable for the pads 66 and 68, for the lands 58 and 60, and for the rollers 56.

Depending on the direction of rotation for the planet pinions 6, the deflection inhibitor I, whatever its form, may be located beyond the offset axis Y such that the axis Y is between the inhibitor I and the main axis X. Likewise, a flexpin assembly B may have two deflection inhibitors I, one inside the axis Y and the other outside the axis Y.

The invention claimed is:

1. An epicyclic gear system comprising:
    a sun gear located along a main axis and having external helical teeth;
    a ring gear also located along the main axis and having internal helical teeth;
    a planet pinion located between the sun and ring gears and having helical teeth, the planet pinion meshing with the sun and ring gears at the helical teeth and rotating about an offset axis that is parallel to the main axis; and
    a carrier including an end member, a flexpin that is cantilevered from the end member and extends into the planet pinion, a sleeve that is mounted on the flexpin remote from the end member and extends back over the flexpin where it is spaced from the flexpin and is within the planet pinion, and a deflection inhibitor that is located between the sleeve and the flexpin and is offset axially from where the sleeve is mounted on the flexpin to prevent the sleeve from deflecting in a plane generally defined by the main and offset axes, yet to allow the sleeve to displace circumferentially relative to the main axis.

2. A gear system according to claim 1 wherein the deflection inhibitor lies in the plane defined by the main and offset axes.

3. A gear system according to claim 2 wherein the deflection inhibitor is a projection extended between the sleeve and the flexpin.

4. A gear system according to claim 2 wherein the projection is attached to the sleeve.

5. A gear system according to claim 1 wherein the deflection inhibitor is a roller located between the sleeve and the flexpin.

6. A gear system according to claim 5 wherein the flexpin and the sleeve have opposing lands and the roller is between the lands.

7. A gear system according to claim 6 wherein the land on the sleeve lies along the bottom of a pocket in the sleeve.

8. A gear system according to claim 1 wherein the deflection inhibitor includes a pad located on the flexpin or on the sleeve.

9. A gear system according to claim 8 wherein the pad is covered with a tribiological coating.

10. A flexpin assembly for establishing an offset axis in an epicyclic gear system, said flexpin assembly comprising:
    a flexpin having a base configured for securement to an end member of a carrier, a head located beyond the base, and a shank located between the base and the head;
    a sleeve located around the flexpin and having a mounting segment where the sleeve is secured firmly to the head of the flexpin and a bore, the surface of which is spaced from the shank of the flexpin;
    a helical planet pinion located around the sleeve and the flexpin;
    a bearing located between the planet pinion and the sleeve to enable the planet pinion to rotate about the offset axis; and
    a deflection inhibitor located between the shank of the flexpin and the sleeve remote from the head of the flexpin for preventing the sleeve from deflecting toward flexpin in a plane that includes the offset axis, but otherwise permitting the sleeve to displace relative to the flexpin.

11. A flexpin assembly according to claim 10 wherein the deflection inhibitor is attached to the sleeve and projects inwardly toward the shank of the flexpin.

12. A flexpin assembly according to claim 10 wherein the deflection inhibitor includes a roller located between the shank of the flexpin and the sleeve.

13. A flexpin assembly according to claim 12 wherein the shank of the flexpin and the sleeve have opposed lands and the roller lies between the lands.

14. A flexpin assembly according to claim 13 wherein the sleeve contains a pocket that opens into the bore of the sleeve and the land on the sleeve is in the pocket.

15. A flexpin assembly according to claim 10 wherein the deflection inhibitor includes a pad mounted on the shank of the flexpin or in the bore of the sleeve.

16. An epicyclic gear system organized about a main axis and comprising:
    a helical sun gear located along the main axis;
    a helical ring gear located around the sun gear and the main axis;
    helical planet pinions located between and engaged with the sun and ring gears, the planet pinions rotating about offset axes that are parallel to the main axis;
    a carrier having an end member located around the main axis beyond the ends of the planet pinions, the carrier at each planet pinion also including:
        a flexpin that is cantilevered from the end member and projects into the planet pinion, the flexpin having a base where the flexpin is secured firmly to the end member, a head located remote from the end member, and a shank located between the base and the head;
        a sleeve located around the flexpin and having a mounting segment where it is secured firmly to the head of the flexpin and a bore in which the shank of the flexpin is located, with the shank being spaced from the surface of the bore;
        a bearing located between the planet pinion and the sleeve to enable the planet pinion to rotate about the offset axis; and
        a deflection inhibitor located between the shank of the flexpin and the sleeve remote from the head of the flexpin to prevent the sleeve from deflecting toward or away from the main axis, but not circumferentially with respect to the main axis.

17. An epicyclic gear system according to claim 16 wherein the deflection inhibitor at each planet pinion is attached to the sleeve and projects inwardly from the sleeve toward the shank of the flexpin.

18. An epicyclic gear system according to claim 16 wherein the deflection inhibitor at each planet pinion includes a roller located between the shank of the flexpin and the sleeve within the bore of the sleeve.

* * * * *